UNITED STATES PATENT OFFICE.

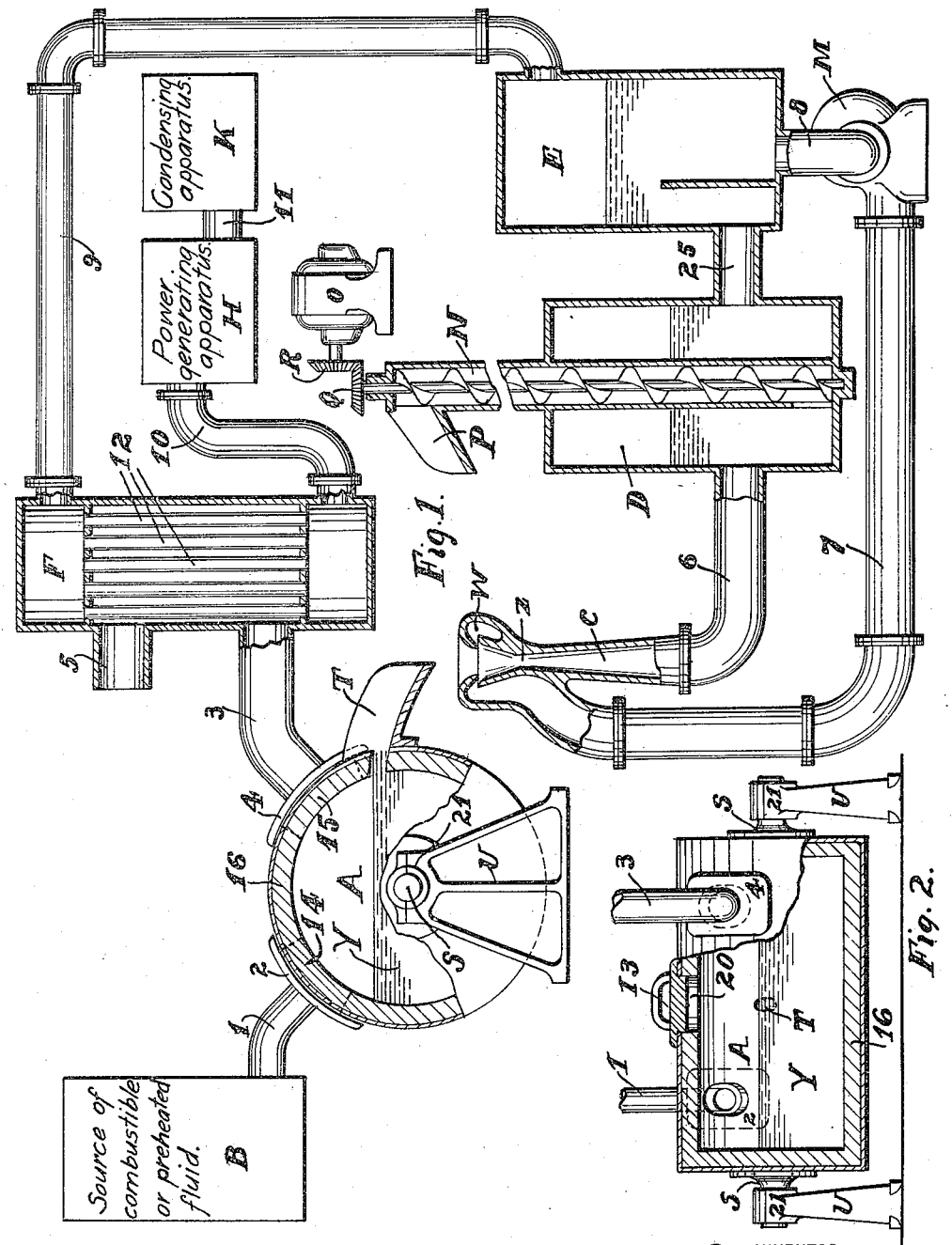

LEONCE L. BATTU, OF NEW YORK, N. Y., ASSIGNOR TO SLAG STEAM GENERATOR COMPANY, OF NEW YORK, N. Y., A CORPORATION OF DELAWARE.

SLAG STEAM-GENERATOR.

1,145,178.    Specification of Letters Patent.    Patented July 6, 1915.

Application filed August 21, 1914. Serial No. 857,932.

*To all whom it may concern:*

Be it known that I, LEONCE L. BATTU, a citizen of the United States, (whose post-office address is 90 West street, New York city and State,) have invented certain new and useful Improvements in Slag Steam-Generators, which improvements are fully set forth in the following specifications.

This invention has for its object improved means by which slag or any preheated material can be employed to heat a liquid, which liquid after having absorbed heat previously contained in the slag is evaporated, the evaporation being due to a reduction of pressure on the liquid.

By means of my invention a power generating apparatus interposed between the apparatus where evaporation takes place and a condensing apparatus is supplied with motive fluid. The steam generated by the heat contained in the slag and in the liquid can be used for a different purpose than to generate power, such as heating, for instance.

By means of my invention the slag discharged by furnaces is stored in a reservoir and the correct amount necessary to generate steam is discharged from the reservoir into the liquid to be vaporized. In order to avoid freezing the slag in the reservoir, I heat the slag contained in the reservoir.

A further purpose of my invention consists in transferring the balance of the heat furnished to the slag in the reservoir to the steam generated by the mixture of slag and liquid.

In the following specifications and claims, I do not wish to be limited to slag, but to any preheated material which may be mixed with a liquid to produce steam.

The accompanying drawings show, Figure 1, a vertical cross section of an embodiment of my invention; and Fig. 2, a vertical cross section through slag reservoir A.

In Fig. 1, B is a source of combustible or preheated fluid. A is a slag reservoir. 16 is a lining made of refractory material. 2 is a shield adapted to cover orifice 14 for the discharge of combustible or preheated material into reservoir A, when reservoir A is located around axis S, which axis turns in bearing 21, held by bearing pedestal U. 15 is the orifice of discharge of the products of combustion or heat-carrying fluid introduced by orifice 14. Orifice 15 connects with pipe 3, having shield 4 attached for the same purpose as shield 2 of pipe 1. F receives the products of combustion or preheated fluid passing through orifice 15, said products of combustion being discharged by pipe 5, F being an interchanger for heat between the products of combustion delivered by pipe 3 and the steam flowing into F by pipe 9 and out of F by pipe 10. The steam passes through pipes 12. F may be constructed in any suitable manner for this interchange of temperature. In the drawing, F is shown constructed as a surface condenser. The body of slag, Y, contained in reservoir A is discharged by duct T into mixing chamber C. A liquid, preferably water, is pumped by pump M through pipe 7 and is discharged into mixing nozzle Z by cone-shaped nozzle W. The mixture of slag passes from mixing chamber C into pipe 6 and from there into separating chamber D. This slag is then taken out by elevator N and is discharged through duct P, elevator N being operated through gears Q and R by motor O. From the separating chamber D by means of a pipe 25 the heated liquid is introduced into evaporating chamber E. The steam generated in evaporating chamber E is discharged into F by means of pipe 9.

In Fig. 2, S, S is the axis of rotation of reservoir A. U, U are the pedestal bearings for axis of rotation S, S, rotating in bearings 21, 21. 2 is the shield of pipe 1, as described in Fig. 1, and 4 is the shield of pipe 3, as described in Fig. 1. T is the discharge duct for the body of slag Y, contained in reservoir A. 20 is an orifice in lining 16, through which slag is poured from the furnace or cinder pots into reservoir A, 13 being the plug to close orifice 20. Pipe 10 leads the steam carried through F by pipes 12 into power generating apparatus H, said power generating apparatus being connected through pipe 11 to condensing apparatus K.

In practising my invention, I introduce a preheated fluid into reservoir A through orifice 14 by means of pipe 1. This preheated fluid can be the gases discharged from soaking pits in steel works or may be gas discharged from blast furnaces or gas producers. In the second instance, this gas will burn in reservoir A through being in contact with the surface of the body of slag Y contained in reservoir A. In both instances this fluid will transfer heat to the slag and will add sufficient heat to prevent its freezing.

The transfer of heat in reservoir A will leave a large amount of heat available, and I use this available amount of heat to superheat the steam generated in the slag steam generating apparatus, and in order to carry out my invention I pass the products of combustion of the fluid discharged by B through pipe 3 into F, which is an interchanger built on lines which may be quite similar to the ordinary surface condenser. The amount of superheat I can give to the steam by means of my invention is very great, inasmuch as the temperature of the slag is never much lower than 1500° F.

Any type of slag steam generator may be used to carry out my invention, the purposes of which are specifically to prevent the slag contained in a storage reservoir from freezing and also to superheat steam generated in the slag steam generator.

I do not wish to be limited to any specific means to heat liquid stored in a reservoir. I have shown one embodiment of my invention and have suggested the use of a combustible element, which in burning will impart heat to the slag, and I have also suggested the use of preheated fluid. It is obvious to those skilled in the art that coal or oil may be burnt in order to secure the results which are set forth in my invention.

Having thus described my invention, I claim as new:

1. In a slag steam generator means to store molten slag and means to burn a fluid in the slag reservoir.

2. In a slag steam generator means to store molten slag in a container, means to burn fuel at the surface of the stored molten slag and means to tilt said molten slag container.

3. In a slag steam generator a container to store molten slag and means to burn fuel in the slag container to maintain the molten condition of the slag.

4. In a slag steam generator means to heat the molten slag stored in a reservoir and means, derived from the heating means applied to the molten slag, to superheat the steam generated.

5. In a slag steam generator means to burn a fuel in a molten slag storage reservoir and to superheat the steam generated by means of the heat contained in the products of combustion discharged from the slag storage reservoir.

6. In a slag steam generator a container to store molten slag, a superheater for the steam generated, a duct leading heating means into said container and a second duct leading said heating means from the container into the superheater.

7. In a slag steam generator a container to store molten slag, a superheater for the steam generated, a duct leading heating means into said container, a second duct leading said heating means from the container into the superheater and means to tilt the container.

In witness whereof I have hereunto subscribed my name this 19th day of August, 1914.

LEONCE L. BATTU.

Witnesses:
C. S. BROOKS,
E. W. TROWBRIDGE.

Copies of this patent may be obtained for five cents each, by addressing the "Commissioner of Patents, Washington, D. C."